US012762241B2

(12) United States Patent
Dobaczewski

(10) Patent No.: US 12,762,241 B2
(45) Date of Patent: Oct. 13, 2026

(54) SYSTEM AND METHOD FOR STORING SYSTEM STATE DATA IN A HARDWARE REGISTER

(71) Applicant: Cypress Semiconductor Corporation, San Jose, CA (US)

(72) Inventor: Jacek Dobaczewski, San Jose, CA (US)

(73) Assignee: INFINEON TECHNOLOGIES AMERICAS CORP., El Segundo, CA (US)

( * ) Notice: Subject to any disclaimer, the term of this patent is extended or adjusted under 35 U.S.C. 154(b) by 517 days.

(21) Appl. No.: 17/854,706

(22) Filed: Jun. 30, 2022

(65) Prior Publication Data

US 2023/0237156 A1 Jul. 27, 2023

Related U.S. Application Data

(60) Provisional application No. 63/303,761, filed on Jan. 27, 2022.

(51) Int. Cl.
*G06F 21/57* (2013.01)
*G06F 21/54* (2013.01)
*G06F 21/55* (2013.01)
*G06F 9/30* (2018.01)
*G06F 12/14* (2006.01)

(52) U.S. Cl.
CPC ............ *G06F 21/575* (2013.01); *G06F 21/54* (2013.01); *G06F 21/554* (2013.01); *G06F 21/577* (2013.01)

(58) Field of Classification Search
CPC ...... G06F 21/575; G06F 21/54; G06F 21/554; G06F 21/577
See application file for complete search history.

(56) References Cited

U.S. PATENT DOCUMENTS

| | | | | |
|---|---|---|---|---|
| 5,218,564 A * | 6/1993 | Haines | G06F 9/3877 | 708/603 |
| 7,571,270 B1 * | 8/2009 | Nemirovsky | G06F 13/364 | 710/200 |
| 9,069,706 B2 * | 6/2015 | Sriram | G06F 21/6218 | |
| 9,959,124 B1 * | 5/2018 | Herbeck | G06F 9/4418 | |

(Continued)

FOREIGN PATENT DOCUMENTS

| | | | | |
|---|---|---|---|---|
| WO | WO-0043879 A1 * | 7/2000 | G06F 11/006 |
| WO | WO-2023209323 A1 * | 11/2023 | G06F 9/30101 |

OTHER PUBLICATIONS

Behnam Farnaghinejad, Antonio Porsia, Annachiara Ruospo, Alessandro Savino, Stefano Di Carlo, Ernesto Sanchez, "Late Contribution: VeriSide: A Modified Verilator for Leakage Assessment at the RTL Level", 2025 IEEE 26th Latin American Test Symposium (LATS), May 2025, Conference Paper, IEE; pp. 1-2 (Year: 2025).*

*Primary Examiner* — Fatoumata Traore
*Assistant Examiner* — Courtney D Fields
(74) *Attorney, Agent, or Firm* — Cooper Legal Group LLC

(57) ABSTRACT

One or more computing devices, systems, and/or methods are provided. In an example, a method comprises executing an application image to initialize a computing system. System state data associated with the initializing of the computing system is stored in a hardware register having at least one lockable until reset bit. A fault condition is identified responsive to the system state data not matching an expected value.

20 Claims, 7 Drawing Sheets

(56) References Cited

U.S. PATENT DOCUMENTS

| | | | | |
|---|---|---|---|---|
| 2011/0264882 | A1* | 10/2011 | Scott | G06F 21/79<br>711/E12.091 |
| 2021/0049111 | A1* | 2/2021 | Dover | G06F 3/0688 |
| 2023/0079673 | A1* | 3/2023 | Bhat | G06F 11/3684<br>717/124 |

* cited by examiner

SYSTEM AND METHOD FOR STORING SYSTEM STATE DATA IN A HARDWARE REGISTER

BACKGROUND

Some computing systems store system state data, such as life cycle data or initialization phase data, during the initialization or booting of the system. System state data is typically stored in the volatile memory of the computing system, such as the static random access memory (SRAM). System state data may be susceptible to glitching attacks, data replacement attacks, or buffer overflow attacks, whereby a malevolent entity attempts to gain unauthorized access to the computing system by modifying the system state data.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a system is provided. The system comprises a processor, a hardware register having at least one lockable until reset bit, and a memory storing an application image comprising instructions, that when executed by the processor cause the processor to store system state data in the hardware register during an initializing of the system.

In an embodiment of the techniques presented herein, a system is provided. The system comprises means for executing an application image to initialize a computing system, means for storing system state data associated with the initializing of the computing system in a hardware register having at least one lockable until reset bit, and means for identifying a fault condition responsive to the system state data not matching an expected value.

In an embodiment of the techniques presented herein, a method is provided. The method comprises executing an application image to initialize a computing system, storing system state data associated with the initializing of the computing system in a hardware register having at least one lockable until reset bit, and identifying a fault condition responsive to the system state data not matching an expected value.

In an embodiment of the techniques presented herein, a non-transitory computer-readable medium storing instructions that when executed facilitate performance of operations is provided. The operations comprise initializing a computing system, storing system state data associated with the initializing of the computing system in a hardware register having at least one lockable until reset bit, and identifying a fault condition responsive to the system state data not matching an expected value.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
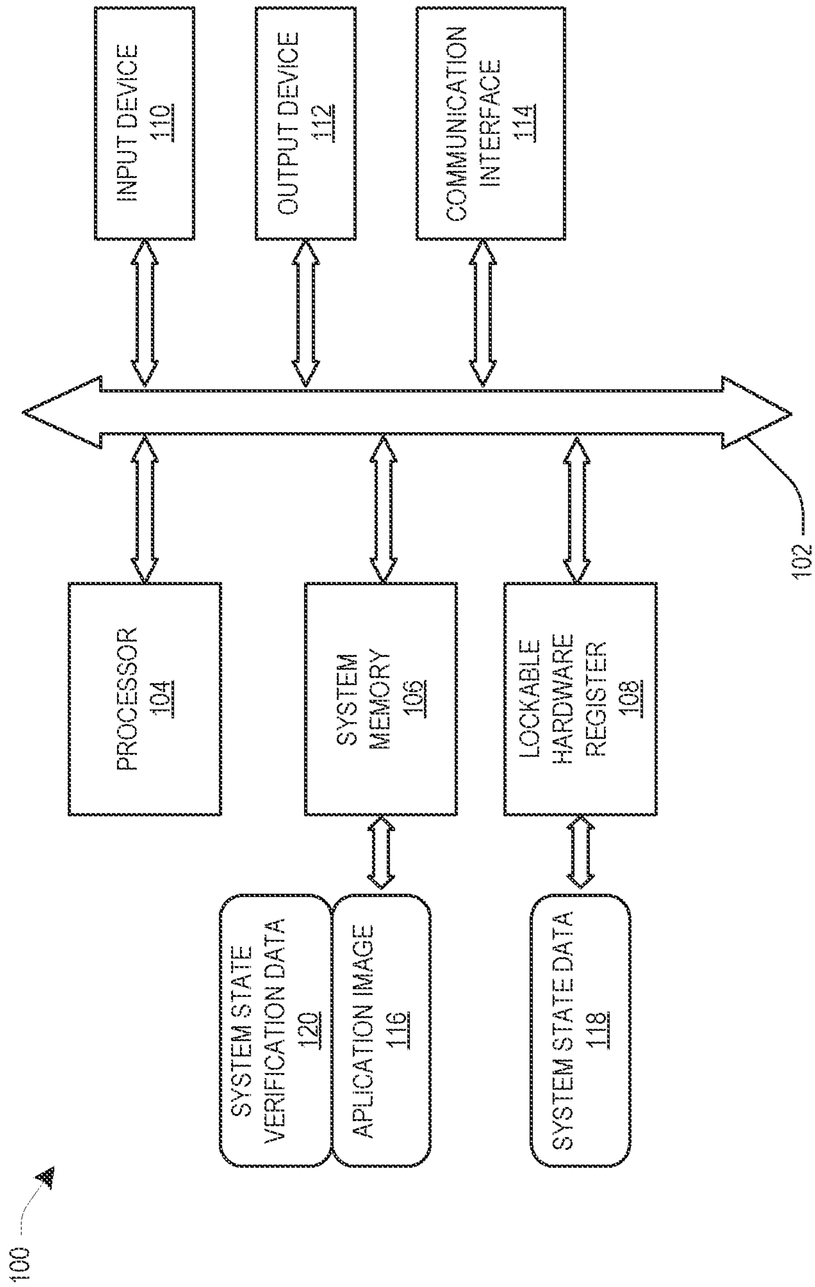
FIG. 1 is a diagram of a computing system, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

According to some embodiments, system state data is stored in a lockable hardware register during an initialization of a computing system. System state data may include life cycle state data that is set once during the initialization of the computing system. Life cycle data specifies whether the computing system is under control of a chip manufacturer, under control of a device manufacturer, or in a secure state and ready for use by a customer. Different security levels may be applied to the firmware and components of the computing system depending on the life cycle state. System state data may also include initialization phase data that indicates the progress of the firmware during the initialization of the computing system. The system state data for the initialization phase changes during the initialization. Different security levels may be applied to the firmware and components of the computing system depending on phase of the initialization. According to some embodiments, the lockable hardware register may include a lock until reset register where a lock signal may be provided to the hardware register causing the data to be locked until the next system reset, or a sticky register where individual bits are locked after being set until the next system reset. The computing system may verify the contents of the lockable hardware register to validate the system state. A fault condition may be signaled if the system state data does not match a valid value.

FIG. 1 is a diagram of a computing system 100, in accordance with some embodiments. In some embodiments, the computing system 100 comprises a bus 102, a processor 104, a system memory 106, a lockable hardware register 108, an input device 110, an output device 112, and a communication interface 114. The computing system 100 may include fewer components, additional components, different components, and/or a different arrangement of components than those illustrated in FIG. 1.

According to some embodiments, the bus 102 includes a path that permits communication among the components of the computing system 100. For example, the bus 102 may include a system bus, an address bus, a data bus, and/or a control bus. The bus 102 may also include bus drivers, bus arbiters, bus interfaces, and so forth. The processor 104 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 104 may be implemented as hardware (e.g., a microprocessor, etc.), a combination of hardware and software (e.g., a SoC, an ASIC, etc.), may include one or multiple memories (e.g., cache, etc.), etc.

In some embodiments, the system memory 106 includes one or multiple memories and/or one or multiple other types of storage mediums. For example, the system memory 106 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The system memory 106 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The system memory 106 may include drives for reading from and writing to the storage medium. The system memory 106 may be external to and/or removable from the computing system 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The system memory 106 may store data, software, and/or instructions related to the operation of the computing system 100.

The system memory 106 stores an application image 116, such as a firmware image, that the processor 104 executes during an initialization of the computing system 100. In some embodiments, the application image 116 is stored in a non-volatile portion of the system memory 106 that retains its data even it power is removed.

In some embodiments, the processor 104 controls the overall operation or a portion of the operation(s) of the computing system 100 by executing the application image 116. The processor 104 performs one or multiple operations based on an operating system and/or various applications or computer programs (e.g., software). In some embodiments, the processor 104 executes the application image 116 during the initialization or boot process and stores system state data 118 in the lockable hardware register 108. In some embodiments, the processor 104 stores system state verification data 120 in the system memory 106 for validating the system state data 118. The system state verification data 120 may be stored in a volatile portion of the system memory 106, such as SRAM.

In some embodiments, the input device 110 permits an input into the computing system 100. For example, the input device 110 may comprise a keyboard, a mouse, a display, a touchscreen, a touchless screen, a button, a switch, an input port, speech recognition logic, and/or some other type of suitable visual, auditory, or tactile input component. The output device 112 permits an output from the computing system 100. For example, the output device 112 may include a speaker, a display, a touchscreen, a touchless screen, a projected display, a light, an output port, and/or some other type of suitable visual, auditory, or tactile output component.

The communication interface 114 permits the computing system 100 to communicate with other devices, networks, systems, sensors, and/or the like on a network. The communication interface 114 may include one or multiple wireless interfaces and/or wired interfaces. For example, the communication interface 114 may include one or multiple transmitters and receivers, or transceivers. The communication interface 114 may operate according to a protocol stack and a communication standard. In some embodiments, the communication interface 114 includes an antenna. The communication interface 114 may include various processing logic or circuitry (e.g., multiplexing/de-multiplexing, filtering, amplifying, converting, error correction, etc.). In some embodiments, the communication interface 114 operates using a long range wireless protocol, such as a cellular protocol or a WiFi protocol, a short range protocol, such as BLUETOOTH™, or a wired protocol, such as Ethernet.

FIGS. 2-5 illustrate embodiments of the lockable hardware register 108. The lockable hardware register 108 includes at least one bit that is lockable until a reset of the computing system 100 is received. For example, the lockable hardware register 108 may be a lock until reset register where all bits are locked until reset or a sticky until reset register where a bit is locked after it is set until reset. The lockable hardware register 108 may be used in conjunction with the system memory 106 to store the system state data 118 and the system state verification data 120.

Figure 2:
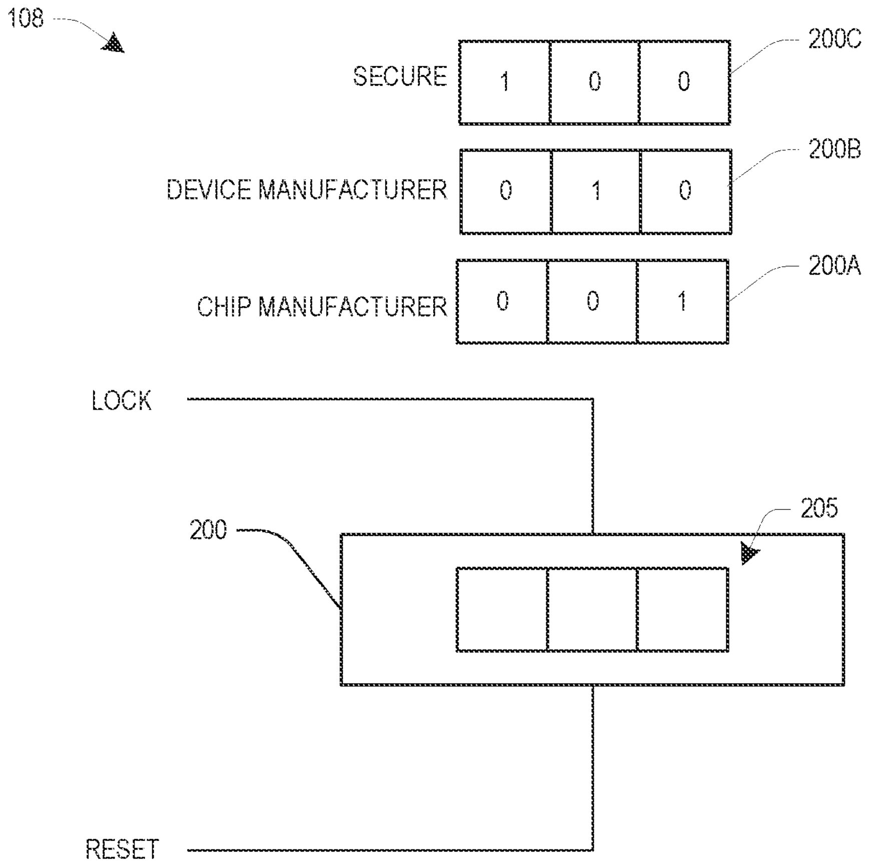
FIGS. 2-5 are diagrams illustrating lockable hardware registers, in accordance with some embodiments.

Referring to FIG. 2, the lockable hardware register 108 comprises a lock until reset lockable hardware register 200, in accordance with some embodiments. A lock signal may be provided to the lockable hardware register 200 causing the data to be locked until the next system reset. In one example, the lockable hardware register 200 stores life cycle state data as the system state data 118. The lockable hardware register 200 may have three bits 205 corresponding to three life cycle states—a chip developer state, a device manufacturer state, and a secure state. To provide for increased Hamming distance, only one bit may be set for a particular life cycle state. For example, the bit pattern 200A for the chip manufacturer state is "001", the bit pattern 200B for the device manufacturer state is "010", and the bit pattern 200C for the secure state is "100". If more than one bit is set in the lockable hardware register 200 the life cycle state is invalid. The validity may be checked using a simple mask operation, (LCS & "111")-1!=0.

Figure 3:
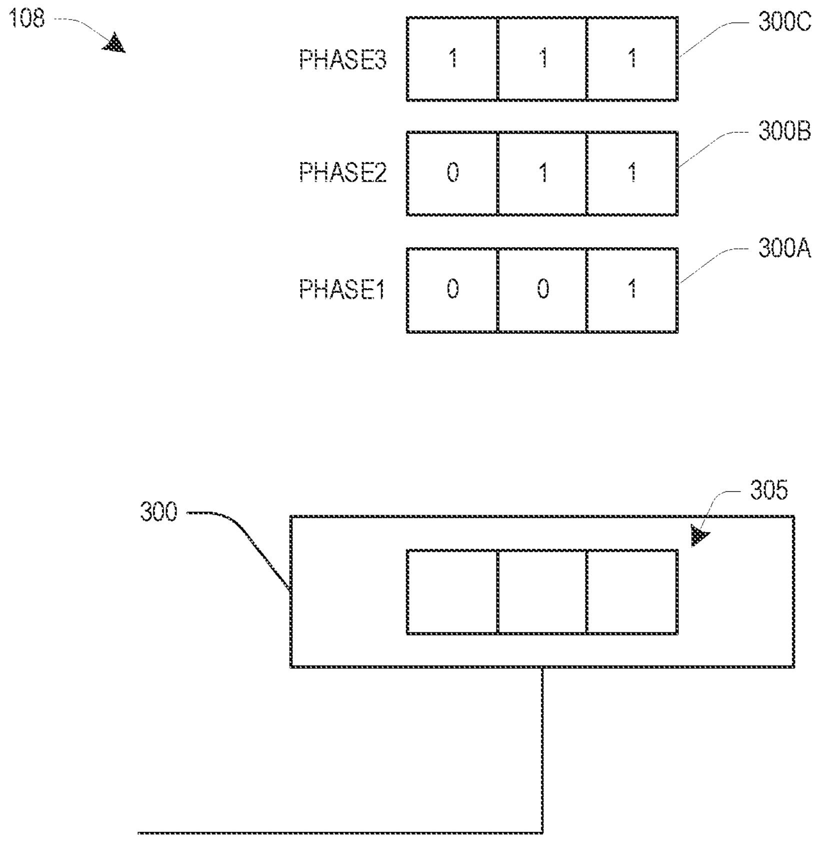

Referring to FIG. 3, the lockable hardware register 108 comprises a sticky until reset lockable hardware register 300, in accordance with some embodiments. After a particular bit is set in the lockable hardware register 300, it is locked and cannot be cleared until a reset occurs. In one example, the lockable hardware register 300 stores initialization phase data as the system state data 118. The lockable hardware register 300 may have three bits 305 corresponding to three initialization phases. A particular initialization phase may start and end at particular code segments or an initialization phase may end after one or more particular tasks have been completed. In some embodiments, one bit may be set for each initialization phase in a cascading manner that sets adjacent bits from least significant bit to most significant bit or from most significant bit to least significant bit. For example, the bit pattern 300A for initialization phase 1 is “001”, the bit pattern 300B for initialization phase 2 is “011”, and the bit pattern 300C for initialization phase 3 is “111”. If a bit is set in the lockable hardware register 300 that does not follow the cascading manner, such as “101” the initialization phase is invalid.

Figure 4:
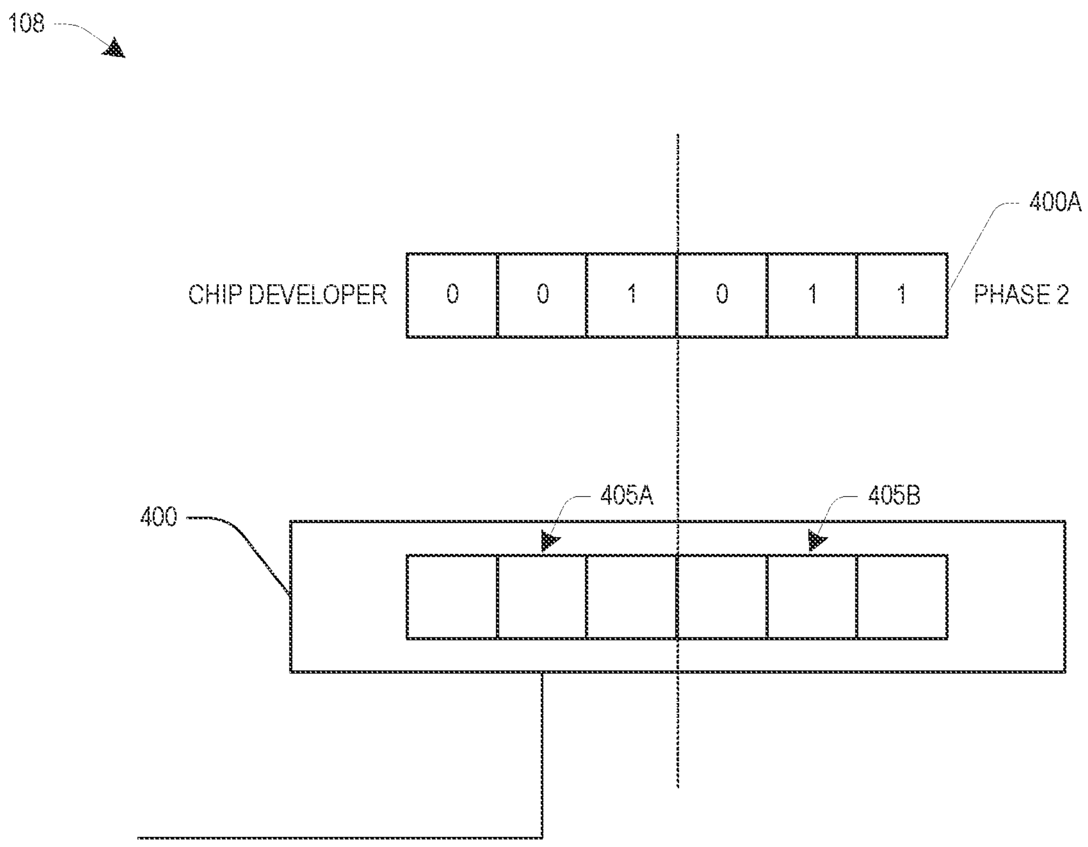

Referring to FIG. 4, the lockable hardware register 108 comprises a sticky until reset lockable hardware register 400, in accordance with some embodiments. After a particular bit is set in the lockable hardware register 400, it is locked and cannot be cleared until a reset occurs. In one example, the lockable hardware register 400 stores life cycle state data in a life cycle state field defined by bits 405A and stores initialization phase data in an initialization phase field defined by bits 405B. The bits 405A correspond to three life cycle states—a chip developer state, a device manufacturer state, and a secure state, and the bits 405B and follow the pattern described above with reference to FIG. 2, where only one of the three bits 405A is set. The bits 405B correspond to the three initialization phases and follow the cascading pattern described above in reference to FIG. 3. For example, the bit pattern 400A corresponds to the chip developer life cycle state “001” in the bits 405A and initialization phase 2 “011” in the bits 405B.

Figure 5:
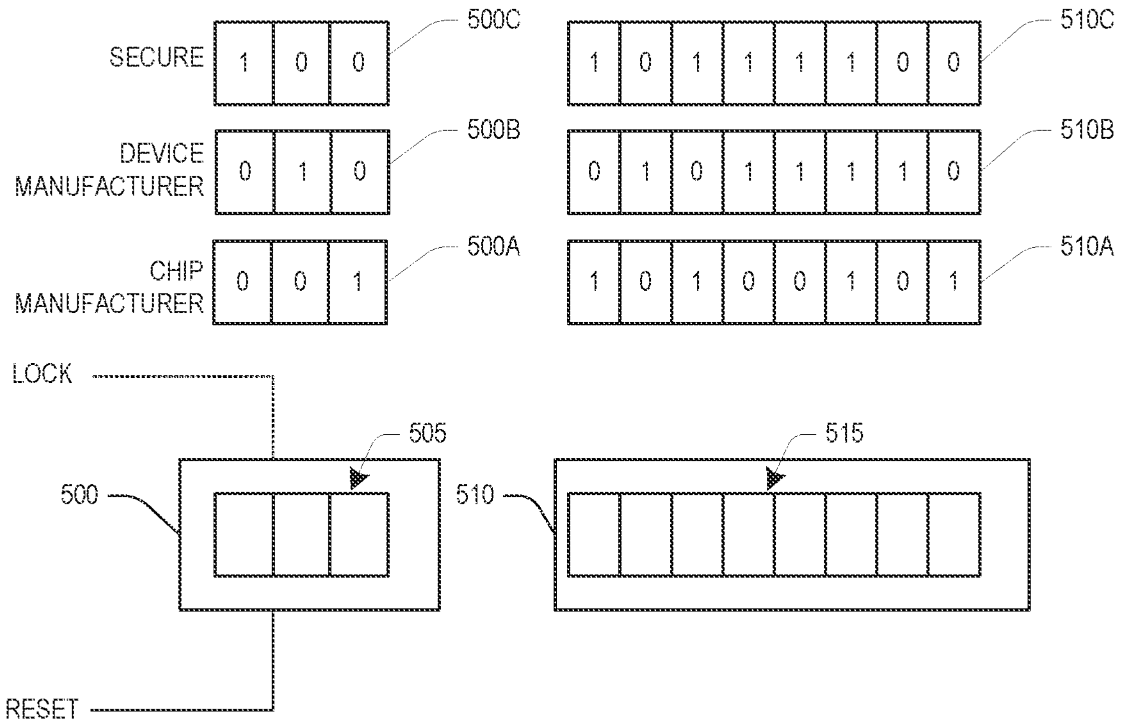

Referring to FIG. 5, a lockable hardware register 500 stores system state data 118 and a system memory location 510 stores system state verification data 120, in accordance with some embodiments. The lockable hardware register 500 may be a lock until reset register or a sticky until reset register. In some embodiments, the lockable hardware register 500 stores life cycle state data, initialization phase data, both life cycle state data and initialization phase data, or some other system state data 118 using bits 505. The system state verification data 120 stored in bits 515 of the system memory location 510 may include predetermined values that correspond to the values of the system state data 118. The system memory location 510 may be a portion of the system memory 106, such as a volatile memory portion (SRAM). In one example, the bit patterns 500A, 500B, 500C correspond to the three life cycle states and follow the pattern described above in reference to FIG. 2, where only one of the three bits 505 is set. The bit patterns 510A, 510B, 510C are also defined for the life cycle states, for example hex “A5” for the chip developer state, hex “5E” for the developer life cycle state, and hex “BC” for the secure life cycle state. The system memory location 510, since it may be implemented in the system memory 106, may have a larger number of bits 515 compared to the number of bits 505 in the lockable hardware register 500. This arrangement allows the Hamming distance to be increased to enhance the level of security for glitching and buffer overflow attacks without incurring an increased cost associated with providing a larger lockable hardware register 500. To glitch the system state data 118, and attacker would have to glitch both the lockable hardware register 500 and the system memory 106, which would require different glitch characteristics and would require glitching twice since the lockable hardware register 500 and the system memory 106 are accessed separately. Further increasing the Hamming distance could be accomplished by increasing the number of bits 515 in the system memory location 510. A successful buffer overflow would be difficult to achieve since the bits 505 in the lockable hardware register 500 cannot be cleared and the system state data 118 and the system state verification data 120 are stored in two different address ranges. The processor 104 may combine the system state data 118 in the lockable hardware register 500 and the system state verification data in the system memory location 510 to generate a combined system state verification parameter and compare the combined system state verification parameter to an expected value to identify a fault condition.

The processor 104 may check the validity of the system state data 118 and signal a fault condition if the data is invalid. Invalid system state data 118 may indicate a malicious attack. Invalid system state data 118 may include more than one bit being set in the life cycle state data, the initialization phase data not following a cascade, or the combined system state data 118 and system state verification data 120 not matching an expected value. Responsive to detecting invalid system state data 118, or system state verification data 120, the processor 104 may lock the computing system 100, reset the computing system 100, send an alert message through the communication interface 114, or perform some other protection function.

Figure 6:
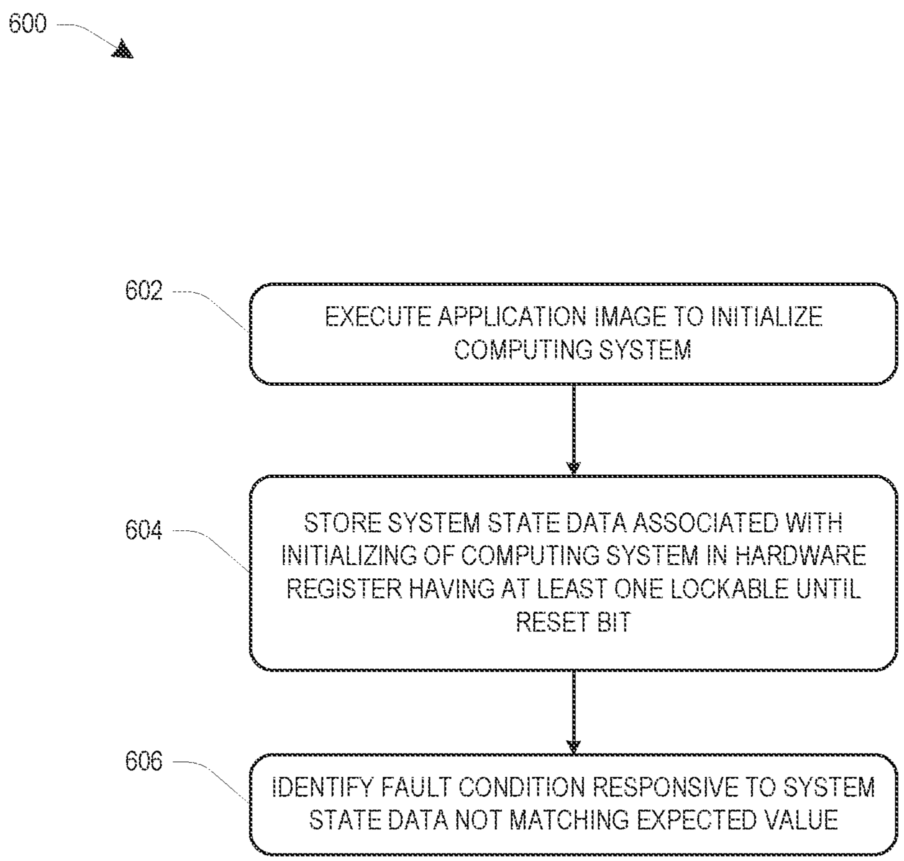
FIG. 6 is a flow chart illustrating an example method for storing system state data in a lockable hardware register, in accordance with some embodiments.

FIG. 6 is a flow chart illustrating an example method 600 for storing system state data 118 in a lockable hardware register 108, in accordance with some embodiments. At 602, an application image 116 is executed to initialize a computing system 100. At 604, system state data associated with the initializing of the computing system 100 is stored in a hardware register 108 having at least one lockable until reset bit. At 606, a fault condition is identified responsive to the system state data 118 not matching an expected value.

Figure 7:
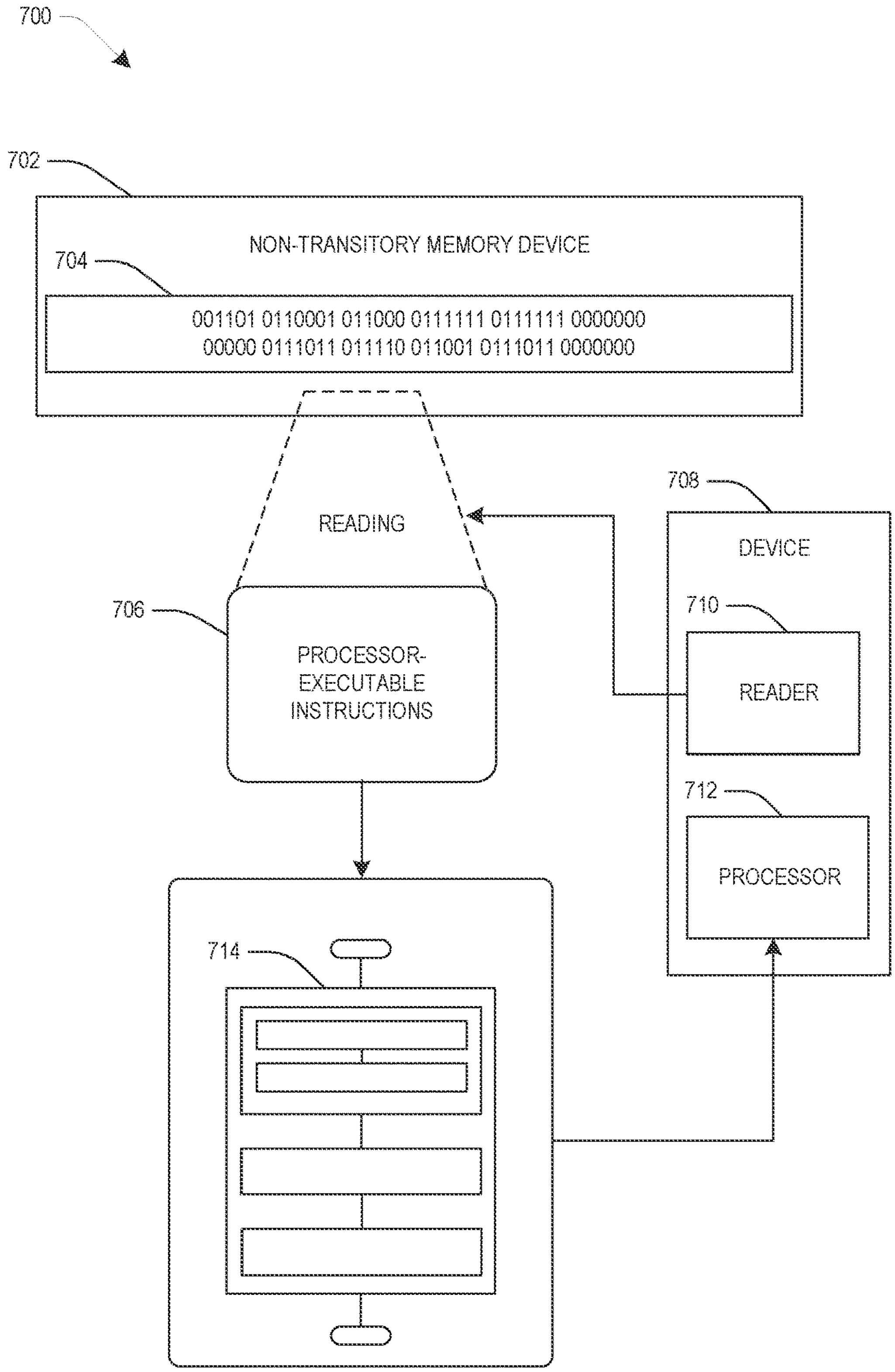
FIG. 7 illustrates an exemplary embodiment of a computer-readable medium, in accordance with some embodiments.

FIG. 7 illustrates an exemplary embodiment 700 of a computer-readable medium 702, in accordance with some embodiments. One or more embodiments involve a computer-readable medium comprising processor-executable instructions configured to implement one or more of the techniques presented herein, such as the method 600. The embodiment 700 comprises a non-transitory computer-readable medium 702 (e.g., a CD-R, DVD-R, flash drive, a platter of a hard disk drive, etc.), on which is encoded computer-readable data 704. This computer-readable data 704 in turn comprises a set of processor-executable computer instructions 706 that, when executed by a computing device 708 including a reader 710 for reading the processor-executable computer instructions 706 and a processor 712 for executing the processor-executable computer instructions 706, are configured to facilitate operations according to one or more of the principles set forth herein. In some embodiments, the processor-executable computer instructions 706, when executed, are configured to facilitate performance of a method 714, such as at least some of the aforementioned method(s). In some embodiments, the processor-executable computer instructions 706, when executed, are configured to facilitate implementation of a system, such as at least some of the one or more aforementioned system(s). Many such computer-readable media may be devised by those of ordinary skill in the art that are configured to operate in accordance with the techniques presented herein.

The term “computer readable media” may include communication media. Communication media typically embodies computer readable instructions or other data in a “modulated data signal” such as a carrier wafer or other transport mechanism and includes any information delivery media. The term “modulated data signal” may include a signal that has one or more of its characteristics set or changed in such a manner as to encode information in the signal.

In an embodiment of the techniques presented herein, a system is provided. The system comprises a processor, a hardware register having at least one lockable until reset bit, and a memory storing an application image comprising instructions, that when executed by the processor cause the processor to store system state data in the hardware register during an initializing of the system.

In an embodiment of the techniques presented herein, the hardware register comprises a lock until reset register, and the processor is configured to lock the hardware register during the initializing of the system.

In an embodiment of the techniques presented herein, the system state data comprises life cycle state data.

In an embodiment of the techniques presented herein, the hardware register comprises a sticky until reset register.

In an embodiment of the techniques presented herein, the processor is to set a first bit of the hardware register after completion of a first phase of the initializing, and the processor is configured to set a second bit of the hardware register adjacent the first bit after completion of a second phase of the initializing.

In an embodiment of the techniques presented herein, the processor is configured to set a first bit of the hardware register responsive to a life cycle state of the system having a first value, the processor is configured to set a second bit of the hardware register responsive to the life cycle state having a second value, and the processor is configured to identify a fault condition responsive to more than one bit being set in the hardware register after completion of the initialization of the system.

In an embodiment of the techniques presented herein, the hardware register comprises a life cycle state field and an initialization phase field.

In an embodiment of the techniques presented herein, the system comprises a volatile memory configured to store a system state verification parameter, wherein the processor is configured to combine the system state data in the hardware register and the system state verification parameter to generate a combined system state verification parameter and identify a fault condition responsive to the combined system state verification parameter not matching an expected value after completion of the initialization of the system.

In an embodiment of the techniques presented herein, a system is provided. The system comprises means for executing an application image to initialize a computing system, means for storing system state data associated with the initializing of the computing system in a hardware register having at least one lockable until reset bit, and means for identifying a fault condition responsive to the system state data not matching an expected value.

In an embodiment of the techniques presented herein, a method is provided. The method comprises executing an application image to initialize a computing system, storing system state data associated with the initializing of the computing system in a hardware register having at least one lockable until reset bit, and identifying a fault condition responsive to the system state data not matching an expected value.

In an embodiment of the techniques presented herein, the hardware register comprises a lock until reset register, and the method comprises locking the hardware register during the initializing of the system.

In an embodiment of the techniques presented herein, storing the system state data in the hardware register comprises storing life cycle state data in the hardware register.

In an embodiment of the techniques presented herein, storing the system state data in the hardware register comprises storing the system state data in a sticky until reset register.

In an embodiment of the techniques presented herein, the method comprises setting a first bit of the hardware register after completion of a first phase of the initializing, and setting a second bit of the hardware register adjacent the first bit after completion of a second phase of the initializing.

In an embodiment of the techniques presented herein, the method comprises setting a first bit of the hardware register responsive to a life cycle state of the system having a first value, and setting a second bit of the hardware register responsive to the life cycle state having a second value, wherein identifying the fault condition comprises identifying the fault condition responsive to more than one bit being set in the hardware register after completion of the initializing of the system.

In an embodiment of the techniques presented herein, storing the system state data in the hardware register comprises storing a life cycle state field and an initialization phase field.

In an embodiment of the techniques presented herein, the method comprises storing a system state verification parameter in a system memory, and combining the system state data in the hardware register and the system state verification parameter to generate a combined system state verification parameter, wherein identifying the fault condition comprises identifying the fault condition responsive to the combined system state verification parameter not matching an expected value.

In an embodiment of the techniques presented herein, a non-transitory computer-readable medium storing instructions that when executed facilitate performance of operations is provided. The operations comprise initializing a computing system, storing system state data associated with the initializing of the computing system in a hardware register having at least one lockable until reset bit, and identifying a fault condition responsive to the system state data not matching an expected value.

In an embodiment of the techniques presented herein, the operations comprise setting a first bit of the hardware register after completion of a first phase of the initializing, and setting a second bit of the hardware register adjacent the first bit after completion of a second phase of the initializing.

In an embodiment of the techniques presented herein, the operations comprise setting a first bit of the hardware register responsive to a life cycle state of the system having a first value, and setting a second bit of the hardware register responsive to the life cycle state having a second value, wherein identifying the fault condition comprises identifying the fault condition responsive to more than one bit being set in the hardware register after completion of the initializing of the system.

In an embodiment of the techniques presented herein, the operations comprise storing a system state verification parameter in a system memory, and combining the system state data in the hardware register and the system state verification parameter to generate a combined system state verification parameter, wherein identifying the fault condition comprises identifying the fault condition responsive to the combined system state verification parameter not matching an expected value.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system, comprising:
- a processor;
- a hardware register comprising at least a first lockable until reset bit and being addressable in a first address range; and
- a memory storing an application image comprising instructions, that when executed by the processor cause the processor to:
  - store system state data having a first Hamming distance in the first lockable until reset bit of the hardware register during an initializing of the system;
  - lock the first lockable until reset bit of the hardware register after storing the system state data in the first lockable until reset bit of the hardware register;
  - store a system state verification parameter in the memory at a second address range different than the first address range;
  - combine the system state data in the hardware register and the system state verification parameter to generate a combined system state verification parameter having a second Hamming distance greater than the first Hamming distance; and
  - identify a fault condition responsive to the combined system state verification parameter not matching an expected value after completion of the initialization of the system.

2. The system of claim 1, wherein the system state data comprises life cycle state data.

3. The system of claim 1, wherein:
- the processor is to set the first lockable until reset bit of the hardware register after completion of a first phase of the initializing; and
- the processor is configured to set a second lockable until reset bit of the hardware register after completion of a second phase of the initializing.

4. The system of claim 1, wherein:
- the processor is configured to set the first lockable until reset bit of the hardware register responsive to a life cycle state of the system having a first value;
- the processor is configured to set a second lockable until reset bit of the hardware register responsive to the life cycle state having a second value; and
- the processor is configured to identify a fault condition responsive to more than one bit being set in the hardware register after completion of the initialization of the system.

5. The system of claim 1, wherein:
- the hardware register comprises a life cycle state field and an initialization phase field.

6. The system of claim 1, wherein:
- the memory comprises:
  - a non-volatile portion configured to store the application image; and
  - a volatile portion addressable at the second address range and configured to store the system state verification parameter.

7. The system of claim 6, wherein:
- the system state verification parameter has a value that depends on a value of the system state data.

8. A method, comprising:
- executing an application image to initialize a computing system;
- storing system state data associated with the initializing of the computing system and having a first Hamming distance in a hardware register having at least a first lockable until reset bit and being addressable at a first address range;
- storing a system state verification parameter in a system memory addressable at a second address range different than the first address range;
- combining the system state data and the system state verification parameter to generate a combined system state verification parameter having a second Hamming distance greater than the first Hamming distance; and
- identifying a fault condition responsive to the combined system state verification parameter not matching an expected value.

9. The method of claim 8, wherein:
- the hardware register comprises a lock until reset register comprising the first lockable until reset bit; and
- the method comprises locking the hardware register during the initializing of the system.

10. The method of claim 8, wherein:

storing the system state data in the hardware register comprises storing life cycle state data in the hardware register.

11. The method of claim 8, wherein:

storing the system state data in the hardware register comprises storing the system state data in a sticky until reset register comprising the first lockable until reset bit.

12. The method of claim 11, comprising:

setting the first lockable until reset bit a first bit of the hardware register after completion of a first phase of the initializing; and setting a second lockable until reset bit of the hardware register adjacent the first lockable until reset bit after completion of a second phase of the initializing.

13. The method of claim 11, comprising:

setting the first lockable until reset bit of the hardware register responsive to a life cycle state of the system having a first value; and setting a second lockable until reset bit of the hardware register responsive to the life cycle state having a second value, wherein:

identifying the fault condition comprises identifying the fault condition responsive to more than one bit being set in the hardware register after completion of the initializing of the system.

14. The method of claim 8, wherein:

storing the system state data in the hardware register comprises storing a life cycle state field and an initialization phase field.

15. The method of claim 8, comprising:

generating the system state verification parameter depending on a value of the system state data.

16. The method of claim 8, wherein:

the hardware register comprises a sticky until reset register comprising the first lockable until reset bit and a second lockable until reset bit; and the method comprises:

locking the first lockable until reset bit responsive to the first lockable until reset bit being set; and locking the second lockable until reset bit responsive to the second lockable until reset bit being set independent of the locking of the first lockable until reset bit.

17. A non-transitory computer-readable medium storing instructions that when executed facilitate performance of operations comprising:

initializing a computing system comprising a processor;

storing system state data associated with the initializing of the computing system and having a first Hamming distance in a hardware register comprising at least a first lockable until reset bit and being addressable at a first address range;

storing a system state verification parameter in a memory addressable at a second address range different than the first address range;

combining the system state data in the hardware register and the system state verification parameter to generate a combined system state verification parameter having a second Hamming distance greater than the first Hamming distance; and identifying a fault condition responsive to the combined system state verification parameter not matching an expected value after completion of the initialization of the computing system.

18. The non-transitory computer-readable medium of claim 17, wherein the operations comprise:

setting the first lockable until reset bit of the hardware register after completion of a first phase of the initializing; and setting a second lockable until reset bit of the hardware register after completion of a second phase of the initializing.

19. The non-transitory computer-readable medium of claim 17, wherein the operations comprise:

setting the first lockable until reset bit of the hardware register responsive to a life cycle state of the system having a first value; and setting a second lockable until reset bit of the hardware register responsive to the life cycle state having a second value, wherein:

identifying the fault condition comprises identifying the fault condition responsive to more than one bit being set in the hardware register after completion of the initializing of the system.

20. The non-transitory computer-readable medium of claim 17, wherein the operations comprise:

storing the system state verification parameter in a volatile portion of a system memory.

* * * * *